SYSTEM FOR LOCATING THE END OF A SYNC PERIOD BY USING THE SYNC PULSE CENTER AS A REFERENCE

Filed April 25, 1963 3 Sheets-Sheet 1

INVENTOR.
KURT ROEDL
BY
T. L. Styner
ATTORNEY

United States Patent Office
3,309,463
Patented Mar. 14, 1967

3,309,463

SYSTEM FOR LOCATING THE END OF A SYNC PERIOD BY USING THE SYNC PULSE CENTER AS A REFERENCE

Kurt Roedl, Anahola, Hawaii, assignor to General Dynamics Corporation, Rochester, N.Y., a corporation of Delaware Filed Apr. 25, 1963, Ser. No. 275,584
8 Claims. (Cl. 178—69.5)

This invention relates to synchronization of the transmitter and receiver of a digital data link and is particularly directed to method and means for accurately determing the time of occurrence of the sync signal.

It is customary in binary data links to transmit synchronizing information at regular intervals, so that the clock at the receiver will always be held in step with the clock at the transmitter. It is customary to transmit the sync information after each group of data bits. So that the sync pulse may be reliably identified in a noisy background, it is preferred that the sync period be identified by a unique signal, such as a three-bit zero-one-zero or a one-zero-one binary signal. Unfortunately, it is found that distortions in the system will cause the voltage level changes of the binary bits to shift ... time so that the instant of voltage level change cannot be relied on for synchronization purposes.

An object of this invention is to provide improved methods and means for accurately determining the time of occurrence of a sync pulse in a digital data system, even though the size and shape of the pulse may be distorted.

A more specific object of this invention is to provide an improved detector for a sync signal of odd numbered bits in a digital data system.

The objects of this invention are attained by finding by computation the logical center of the sync period. Computation comprises principally a clock pulse counting technique controlled by the voltage level changes at the leading or trailing edges of the center pulse of the sync period. A counter is gated on, or enabled, to count clock pulses at one rate after one level change and is then enabled to counter at twice the first rate after the second level change and until the end of a period, known as the sync period, of known length. At the end of the sync period, the counter will have accumulated a clock-pulse count equal to the entire sync period, and the full count will have been accumulated in a time period somewhat less than the sync period. A distinct output signal from the counter may thus be obtained precisely at the end of the sync period, regardless of the distortion of the bit signals.

Other objects and features of this invention will become apparent to those skilled in the art by referring to the specific embodiments described in the following specification and shown in the accompanying drawings, in which.

Figure 1:
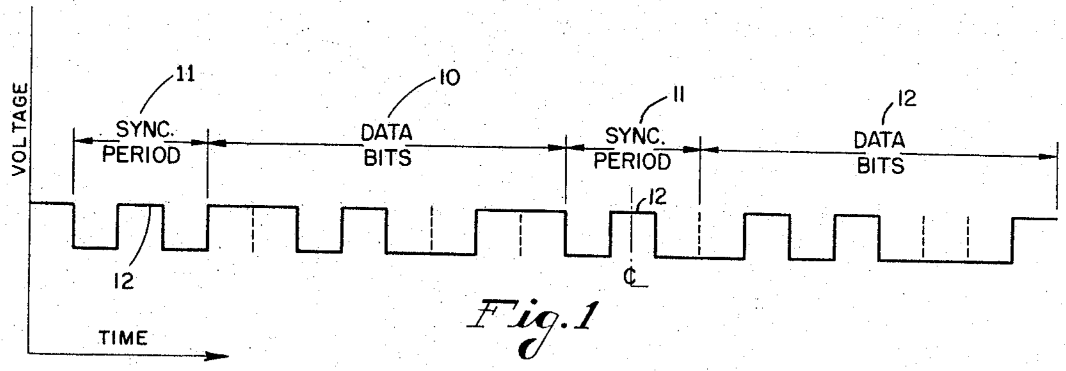
FIG. 1 is a voltage diagram of one type of data and sync pulses treated here.

The particular code for transmitting information contemplated here and shown in FIG. 1 comprises groups 10 of binary data bits, interspersed with sync signals 11 of coded groups of binary bits. In the specific example illustrated, a group of eight data bits alternates with a group of three sync bits. An odd number of sync bits are preferred, three being employed here. The sync bit code shown in enlarged detail in FIG. 2 comprises the logical zero-one-zero combination, although one-zero-one signal is the full equivalent, in binary logic. It has been found that distortion in the transmitting link will erratically change the duration of the central bit 12 of the sync period, and that the leading or trailing edges of bit 12 are unreliable for synchronizing purposes. Fortunately, the distorted pulse remains, generally, substantially centered in the correct time position.

Figure 2:
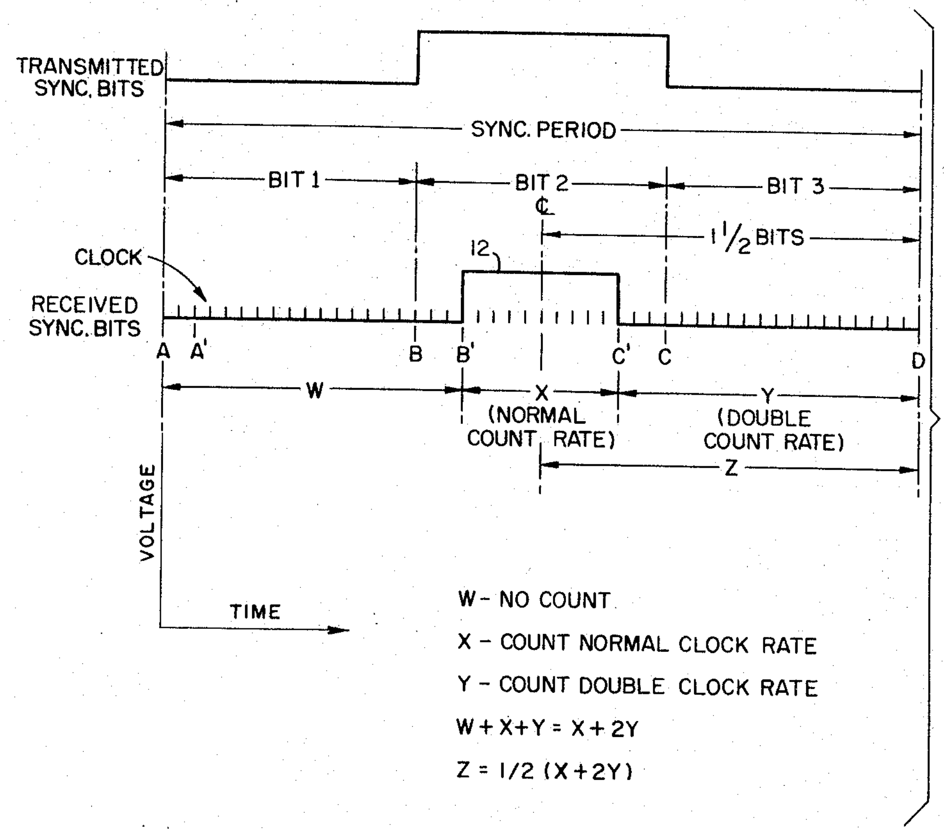
FIG. 2 is an expanded voltage diagram of the transmitted signals during the sync period.

The boundaries of the three sync bits of FIG. 2 are identified on the time scale of FIG. 2 at A, B, C and D. Distortion in the transmitting link may cause the received and detected level changes of the second bit to occur at B′ and C′. The duration of B′—C′ may be less than B—C, as shown, or greater than B—C. Although the time intervals W, X, and Y are unequal, the sum of the three intervals remain constant, and accordingly the time period Z from the center of the sync period to the end of the sync period is fixed. This invention provides means for computing logically the time period Z by eliminating from the computation the unknown and variable factor $X/Y$.

Time throughout the sync period is measured by the local clock pulse generator which, in the example illustrated, is assumed to have a frequency of sixteen clock pulses per bit. This means that the duration of the three-bit sync period is forty-eight clock periods. However, since the transmitter and receiver are not synchronized, the bit decoding at the receiver may lag or lead the bit encoding at the transmitter so that the end of one data group 10 and the beginning of the ensuing sync period can be expected to occur, not at time A, but at time A′, before or after A, see FIG. 3. For this reason, the leading edge of the sync signal cannot be relied on for synchronizing purposes.

In brief, the logic circuits for measuring Z, to find the center of the sync period, comprise a counter, referred to below in connection with FIG. 4, for counting the clock pulses at normal clock rate between B′ and C′ and for then counting at double clock rate from C′ to D. Then, at time D the counter content will include clock pulses equal in number to the entire sync period, $W+X+Y$. If, now, the leading and trailing edges of bit 2 are uniformly distorted as is usually the case, so that phase lag and lead, C—C′ and B′—B are complementary, $W=Y$ and $W+X+Y=X+2Y$. It follows that if the counter counts at one rate during time X and at twice that rate during time Y, a known count will be accumulated at instant D. A logical AND gate appropriately coupled to the binary stages of the counter will yield a voltage pulse at instant D which can be relied on for synchronization of the receiver, regardless of the mutilation of the sync bits.

Figure 4:
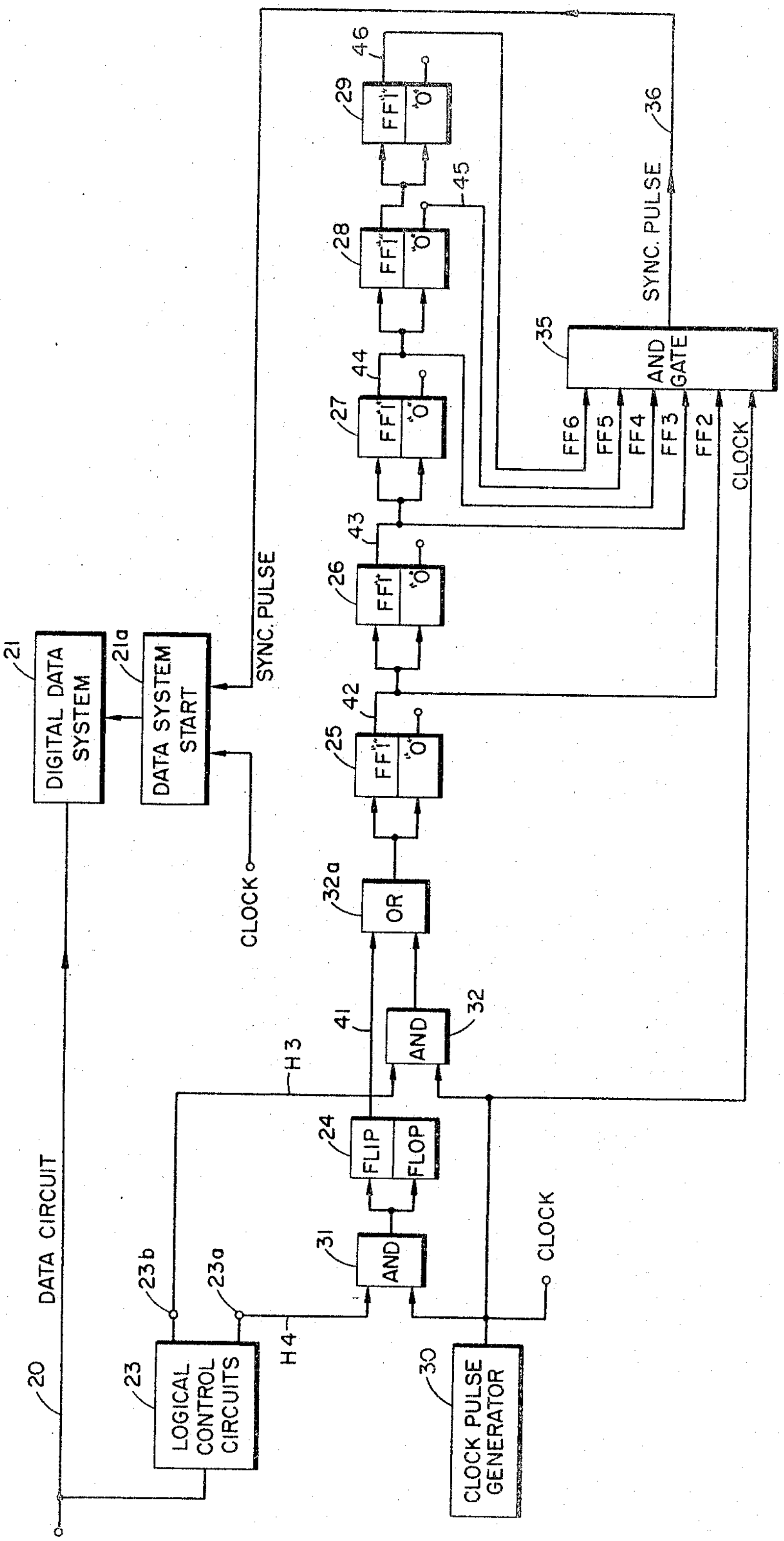
FIG. 4 is a block diagram of the counter and control circuits of the system of this invention.

In FIG. 4, the data circuit 20 feeds binary bits from left to right to the digital data system 21 for decoding and reading and/or printing out the message of the data bits. The readout processes are controlled at the local clock rate, the decoding process of each data group being started, at instant D, by the data system start means **21*a*. The end of the data bit transmission 10 and start of the sync period 11 at a time A′ are detected in the logical control circuit 23. The first level change, B′, after the start of the sync period puts an enabling voltage on terminal 23*a* which will close gate 31 and admit clock pulses from generator 30 to the first flip-flop stage 24 of the counter 24–29. The second level change, C′, after the start of the sync period puts an enabling voltage on terminal 23*a* which will close gate 31 and admit the clock pulses to the second flip-flop 25 of the counter. Voltages at 23*a* and 23*b* are complementary so that only one of the two gates 31 and 32 are enabled at a time. The counter comprises stages 24, 25, 26, 27, 28 and 29 cascaded in usual counter fashion. Each flip-flop has two outputs, as usual, one of which is "high" while the other is "low," and the input circuit of which includes a steering circuit for reversing the stable state of the flip-flop upon receipt of each incoming pulse of one polarity. This means that flip-flop 24 reverses in response to each clock pulse applied thereto through the enabling AND gate 31, and the second flip-flop 25 will respond, through OR gate 32***a*, to alternate changes of state of the preceding flip-flop. It follows that, since the clock pulses may be applied to either the first stage 24 or to the second stage 25, the counting and accumulating rate can be either equal to the clock rate or twice the normal clock pulse rate. And, as stated, whether the clock pulses are introduced at the first or at the second stage depends on control circuits 23. The gates 31 and 32 are each preferably of the NAND type with an AND function. The details of the control circuits 23, not claimed per se, are of any logical design which will respond to the last of the eight data bits at A′ and, hence, will identify the beginning of the sync period.

In operation, counters 24–29 count at normal clock rate during the interval between B′ and C′, and then count at twice the normal clock rate during the interval from C′ to D. It will be observed that with the particular counter shown, all of the "1" terminals of the flip-flops, except flip-flop 28, are high when the count equivalent to time $X+2Y$ has been reached. By connecting the "1" terminals of flip-flops 25, 26, 27 and 29 and the "0" terminal of flip-flop 28 to the AND gate 35, a clock pulse on line 36 will appear precisely at time D. The center bit 12 of the sync period 11 is symmetrical about the timed center (indicated by the center line C/L) of the sync period. Stated another way, the center of the bit occurs in a fixed time sequence with the nominal center C/L, and in the illustrated case is coincident therewith. The counter begins its operation at B′ and when it holds a count of 47, the next clock pulse will actuate the AND gate 35 which generates the sync pulse exactly at time D.

Figure 3:
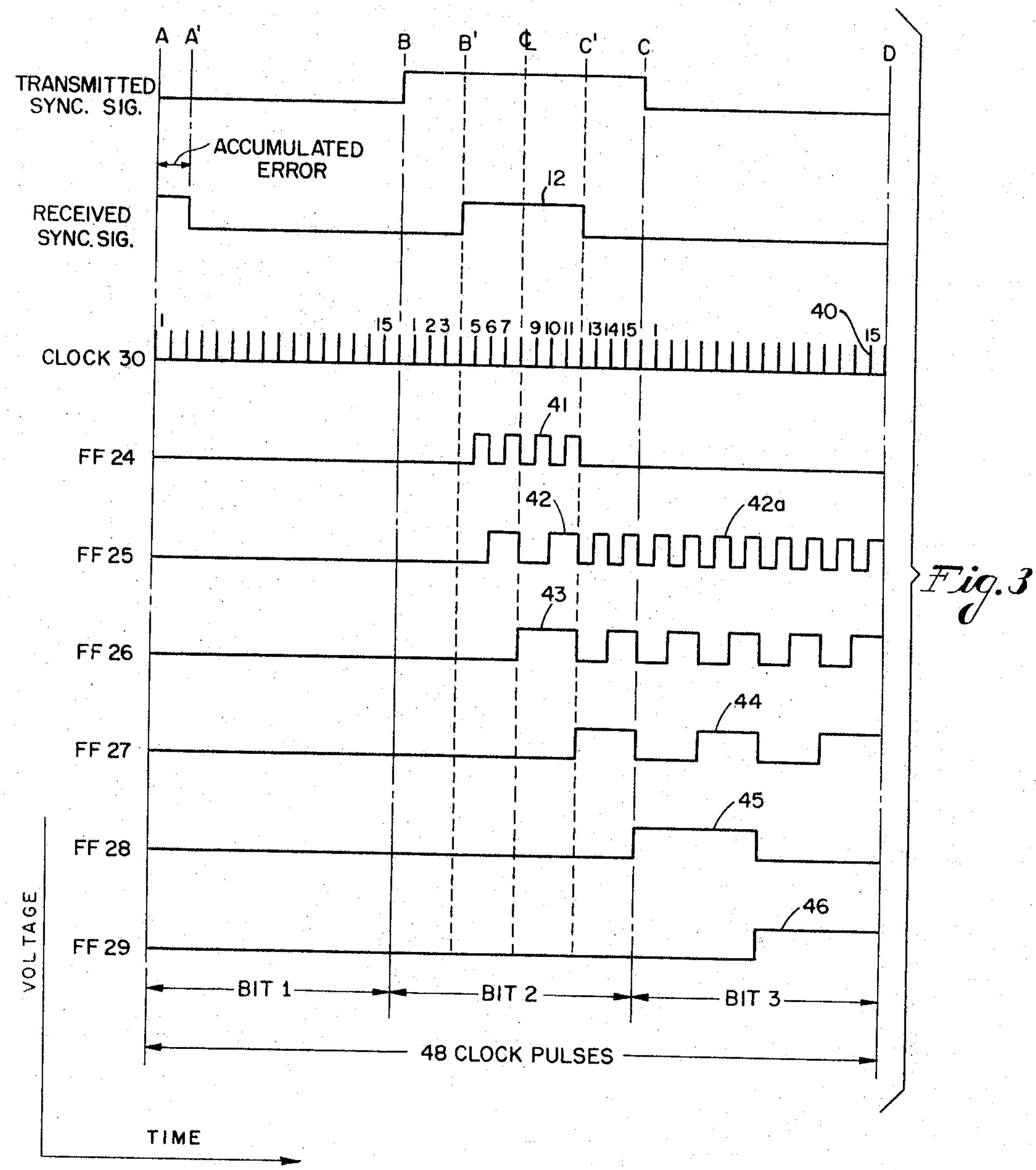
FIG. 3 is a voltage diagram of the various stages of a counter of this invention.

The operation of the particular counter shown in FIG. 4 may be seen in the voltage diagrams of FIG. 3 where the clock pulses 40 from generator 30 are admitted to the first flip-flop 24 after the first level change at B′. While the counter is counting at normal rate between B′ and C′, the voltages on lines 41, 42 and 43 will be found at the "1" terminals of the first, second and third flip-flops. Now, when the second voltage level changes on the data circuit at time C′, the first stage of the counter is disabled and the clock pulses are admitted directly to the second stage whereupon the counting rate is doubled as indicated at 42*a*. The voltages at the fourth, fifth and sixth stages are shown on lines 44, 45 and 46. Note that at time D, in the particular counter shown, the first, second, third, fourth and sixth stages are standing "high" and stage five is standing "low". It is clear, then, that a logical one will appear at the output of AND gate 35 when the inputs of the AND gate are connected to the appropriate "high" and "low" output terminals of the six flip-flop stages at time D. In the example considered here where there are sixteen clock pulses per bit, the forty-eighth clock pulse occurs at time D and, in FIG. 4, is fed via line 36 to the data start system 21*a* to admit clock pulses to the data receiver 21 at the beginning of reception of the eight-bit data message from the data circuit.

The receiver is now precisely synchronized with the received information, even though the duration of the B′—C′ period may vary erratically and even though the time of occurrence of A′ may be unknown.

What is claimed is:

1. The method of generating a sync pulse with the aid of a train of bit signals at least one of which occurs within a sync period, the center of said one bit signal occurring in fixed time relation with respect to the nominal center of said sync period, said method comprising generating clock pulses of fixed repetition rate, then accumulating and counting said pulses at one rate during the interval of said one bit signal, then accumulating and counting said pulse at another rate twice said one rate after the termination of said one bit signal until a predetermined number has been counted, said predetermined number corresponding to the duration in terms of clock pulses of said sync period, and finally gating out said sync pulse when said predetermined number is reached.

2. In a data system including clock-controlled means for transmitting and for remotely receiving groups of data binary bits, said groups of data bits being interspersed with a sync signal having a plurality of bits, including a reference bit symmetrical with the timed center of said sync signal for synchronizing the data decoding means at the receiver with the data encoding means at the transmitter, the method of detecting a received distorted sync signal to synchronously start decoding operation of the succeeding group of data bits, said method comprising the step generating clock pulses at the receiver, then counting the generated clock pulses at one rate from the time of the first voltage change of said reference bit until the second voltage change of said reference bit, then counting clock pulses at twice said one rate after said second voltage change until a count of a predetermined number is accumulated, then generating a distinct synchronizing pulse at the instant of said predetermined number, and then employing said distinct synchronizing pulse to start said decoding operation.

3. In a data system including unsynchronized clock pulse generators at the data transmitting station and at the data receiving station, respectively, where zero-one-zero type binary sync bit signals are generated in a sync period and are transmitted to the receiver after each group of data bits for correcting accumulated timing error in the decoding equipment at the receiving station with respect to the encoding equipment at the transmitting station, the method of synchronizing the beginning of each data decoding operation in response to each sync period comprising the step of generating clock pulses at the receiving equipment, then accumulating locally generated clock pulses at one rate starting at the instant of the first voltage change of said one bit sync signal and continuing until the second voltage change of said one bit sync signal, then accumulating said locally generated clock pulses at twice said one rate after said second voltage change until a count of a predetermined number is accumulated, and finally gating a synchronizing sync pulse to the data decoding means at the instant of said predetermined number to start data decoding operation.

4. In a system for synchronizing the clock-controlled transmitter and clock-controlled receiver of a binary data link including means for multiplexing a fixed number of data bits with a fixed odd number of sync bits in a sync period, with one of said sync bits being symmetrical in said sync period, means at the receiver for generating a synchronizing pulse at the end of said sync period comprising a clock pulse source and a multiple stage binary counter, means for sensing a first and a second voltage level change of said symmetrical bit, means for counting at one clock rate between said first and second level changes, and means for counting at twice said rate after said second level change, and means for generating said synchronized pulse when the counter means content reaches a predetermined number corresponding to the end of said sync period.

5. In a data system for receiving groups of data binary bits interspersed with groups of sync bits in a sync period from a remote transmitting station, having a receiver comprising a local clock generator, a counter of the shift register type including a cascaded series of binary flip-flop stages, gate means responsive to the first voltage change of one of said sync bits which is symmetrical about the center timed position of said sync period for admitting clock pulses to the first stage of said counter to count in said counter clock pulses at one rate, a second gating means responsive to the second voltage change of said symmetrical bit for admitting clock pulses of said generator to the second stage of said counter to count said clock pulses at twice said one rate, a logical AND gate means coupled to the stages of said counter to pass a clock pulse when the contents of said counter has reached a predetermined number, the output of said logical gate being connected to the digital data decoding equipment of said receiver to commence said decoding operation.

6. In a data transmission system in which a train of sync bit signals is transmitted, at least one of which occurs within a sync period, the center of said one bit signal occurring in fixed time relation to the nominal center of said sync period, a system for generating a sync pulse comprising (a) clock pulse generator means for generating pulses of a fixed repetitious rate, (b) counting means coupled to said generator means for accumulating and counting said pulses at different rates, (c) means responsive to said one bit signal for conditioning said counting means to count and accumulate pulses at a first rate during said one bit interval, (d) means responsive to the termination of said one bit signal for conditioning said counting means to count and accumulate pulses at a second rate which is a multiple of said first rate, (e) means responsive to the accumulation in said counting means of a count equal to a predetermined number of pulses while said counting means is conditioned to count at said second rate for generating said sync pulse, and (f) said predetermined number being a function of a fixed time interval measured between the timed center of said one bit signal and the timed position when said sync pulse is to be generated.

7. The invention as set forth in claim 6 wherein said second rate is twice said first rate.

8. The invention as set forth in claim 6 wherein said sync pulse generating means includes an AND gate coupled to said clock pulse generating means and said counting means.

References Cited by the Examiner

UNITED STATES PATENTS

| | | | |
|---|---|---|---|
| 2,546,316 | 3/1951 | Peterson | 179—15 |
| 2,806,205 | 9/1957 | Donath | 324—68 |
| 3,057,962 | 10/1962 | Mann | 179—15 |

OTHER REFERENCES

Hsiao, M.Y. et al.: Synchronizing Circuit, in IBM Technical Disclosure Bulletin, vol. 4, No. 1, June 1961, pp. 21–22.

DAVID G. REDINBAUGH, *Primary Examiner.*

J. T. STRATMAN, *Assistant Examiner.*